United States Patent Office.

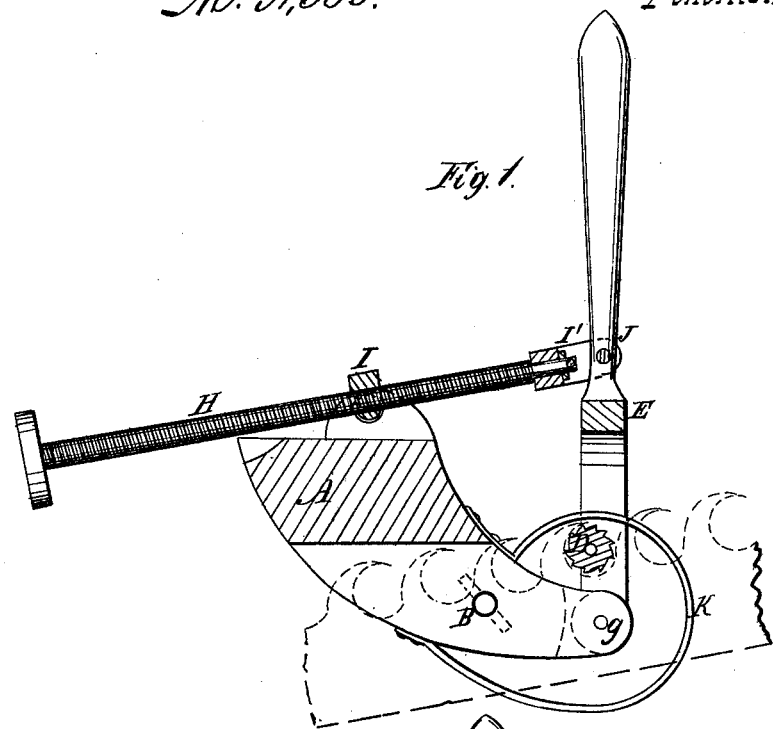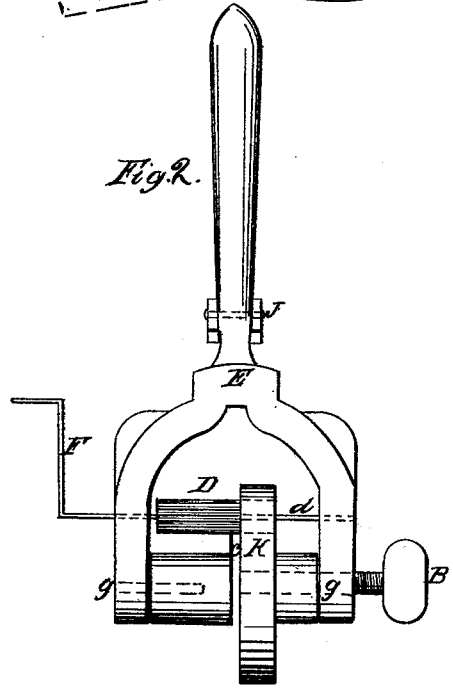

ABRAHAM STAFFER AND PETER STAFFER, OF SALT CREEK, INDIANA.

Letters Patent No. 91,380, dated June 15, 1869.

IMPROVEMENT IN SAW-GUMMER.

The Schedule referred to in these Letters Patent and making part of the same.

*To all whom it may concern:*

Be it known that we, ABRAHAM STAFFER and PETER STAFFER, of Salt Creek, in the county of Porter, and State of Indiana, have invented a new and useful Improvement in Saw-Gummer; and we do hereby declare that the following is a full, clear, and exact description thereof, which will enable those skilled in the art to make and use the same, reference being had to the accompanying drawings, forming part of this specification.

This invention relates to a new and useful improvement in machines for gumming saws, whereby the saw may be gummed without removing the same from the frame.

The invention consists in arranging a rotary cutter in a portable frame or block, and feeding the cutter to the saw by means of a lever or screw, the whole arranged as hereinafter described.

Figure 1 represents a sectional side view, and
Figure 2, a front view of the machine.

Similar letters of reference indicate corresponding parts.

A is the block or foundation to which the screw and lever are attached, and which, in gumming, is itself attached to the saw by a thumb-screw, B. This block is slotted for the saw to enter, as indicated in the drawing, fig. 1.

The slot is also seen in fig. 2 at *c*.

D is the cutter, which is a cylinder fluted or serrated longitudinally, and fixed upon a shaft, *d*, which revolves on bearings in the crotch of the lever E, as seen in the drawing.

The cutter is revolved by hand, through the crank F, or by a band or belts from any convenient part of the machinery.

The lever E is attached to the block A by pivots, as seen at *g g*.

The cutter may be pressed to the saw by this lever, but to make the motion of the cutter more positive, we move the lever by a screw, H.

This screw works in a nut, I, which is hung on pivots, so that it may adjust itself to the motion of the screw, as the lever is moved.

The screw is connected to a clevis, I', which is attached to the lever by a pin, J. In the movement of the lever, this pin describes an arc of a circle, which renders an oscillating motion of the nut necessary.

K is a guard, against the edge of which the saw is held, to keep it in an upright position when being gummed.

This gummer is adapted to either muley, sash, or circular saws.

By this method of gumming, what is known as a "hawksbill tooth," is formed, which is considered a great improvement over the ordinary-shaped tooth.

Having thus described our invention,

We claim as new, and desire to secure by Letters Patent—

The arrangement of the lever E, the screw H, nut I, and cutter D, in combination with the block A, all the parts being constructed as described, and for the purposes set forth.

The above specification of our invention signed by us, this 5th day of October, 1868.

A. STAFFER.
P. STAFFER.

Witnesses:
J. R. MILLAR,
I. N. BEESON.